United States Patent [19]

Hiyoshi et al.

[11] Patent Number: 5,264,090
[45] Date of Patent: Nov. 23, 1993

[54] METHOD FOR THE ELECTROLYSIS OF AN ALKALI METAL CHLORIDE USING A CATION EXCHANGE MEMBRANE

[75] Inventors: Tatsuo Hiyoshi; Akio Kashiwada, both of Yokohama, Japan

[73] Assignee: Asahi Kasei Kogyo Kabushiki Kaisha, Osaka, Japan

[21] Appl. No.: 770,925

[22] Filed: Oct. 4, 1991

[30] Foreign Application Priority Data

Oct. 5, 1990 [JP] Japan .................. 2-266512

[51] Int. Cl.$^5$ ............................................ C25B 1/16
[52] U.S. Cl. ........................ 204/98; 204/128; 204/296
[58] Field of Search .................. 204/98, 128, 296

[56] References Cited

U.S. PATENT DOCUMENTS

| | | | |
|---|---|---|---|
| 4,202,743 | 5/1980 | Oda et al. | 204/98 |
| 4,212,713 | 7/1980 | Suhara et al. | 204/98 |
| 4,900,408 | 2/1990 | Powers | 204/98 |
| 4,904,701 | 2/1990 | Hiyoshi et al. | 521/32 |
| 5,039,382 | 8/1991 | Suzuki et al. | 204/98 |
| 5,087,345 | 2/1992 | Kashiwada et al. | 204/295 |
| 5,149,403 | 9/1992 | Shimohira et al. | 204/296 |

FOREIGN PATENT DOCUMENTS 0327313 8/1989 European Pat. Off.
8809799 12/1988 PCT Int'l Appl.

*Primary Examiner*—Kathryn Gorgos
*Attorney, Agent, or Firm*—Birch, Stewart, Kolasch & Birch

[57] ABSTRACT

A method for the electrolysis of an alkali metal chloride in an electrolytic cell is disclosed, in which use is made of a cation exchange membrane comprising a carboxylate-containing fluorocarbon polymer layer disposed on a cathode compartment side and provided on its surface with an inorganic coating, and a sulfonate and/or carboxylate-containing fluorocarbon polymer layer disposed on an anode compartment side and having a water content of from 3 to 10% by weight. By this method, an alkali metal hydroxide, e.g., sodium hydroxide, can be directly produced in a concentration as high as 45–55 % by weight from a saline solution having an alkali metal chloride concentration as low as from 3.0 to 3.5N with reduced energy consumption, stably for a prolonged period of time.

7 Claims, No Drawings

METHOD FOR THE ELECTROLYSIS OF AN ALKALI METAL CHLORIDE USING A CATION EXCHANGE MEMBRANE

BACKGROUND OF THE INVENTION

1. Field of the Invention

The present invention relates to a method for the electrolysis of an alkali metal chloride using a cation exchange membrane More particularly, the present invention is concerned with a method for the electrolysis of an alkali metal chloride in an electrolytic cell, in which use is made of a cation exchange membrane comprising a carboxylate-containing fluorocarbon polymer layer disposed on a cathode compartment side and provided on its surface with an inorganic coating, and a sulfonate and/or carboxylate-containing fluorocarbon polymer layer disposed on an anode compartment side and having a specific water content. By this method, an alkali metal hydroxide, e.g., sodium hydroxide, can be directly produced in a concentration as high as 45-55% by weight from a saline solution having an alkali metal chloride concentration as low as from 3.0 to 3.5N with reduced energy consumption, stably for a prolonged period of time.

2. Discussion of Related Art

The process for electrolyzing an alkali metal chloride into an alkali metal hydroxide and chlorine using an ion exchange membrane of a fluorocarbon polymer is now widely used, because a high quality alkali metal hydroxide can be produced with low energy consumption. Especially, in the art of sodium chloride electrolysis using an ion exchange membrane, a cation exchange membrane of a fluorocarbon polymer having carboxylate groups on its cathode compartment side is advantageously used, because an extremely high current efficiency is stably obtained for a prolonged period of time.

The sodium hydroxide (hereinafter frequently referred to as "caustic soda") is now generally distributed on the market in the form of an aqueous solution having a concentration of about 50% by weight, whereas the caustic soda solution produced by electrolysis now generally has a concentration of only up to about 40% by weight. Accordingly, in the art, the problem of this difference in concentration has been coped with by concentrating the caustic soda solution by means of steam or other energy source. Therefore, there has been a strong demand in the art for a method by which caustic soda can be directly produced in a concentration equal to that of the commercially distributed caustic soda with high efficiency, without additional energy consumption for concentrating. However, the conventional electrolyzing methods using an ion exchange membrane have had a drawback in that although high current efficiency is obtained in the production of caustic soda having a concentration of up to about 40% by weight, the production of caustic soda of higher concentrations than about 40% by weight is likely to lower current efficiency and increase electrolytic voltage to thereby cause an increase in energy consumption.

Further, as described in U.S. Pat. No. 4,212,713, at a temperature as high as 80° C. or above, the carboxylate groups of an ion exchange membrane are extremely unstable and gradually decomposed in a high concentration aqueous solution of an alkali metal hydroxide.

Intensive efforts have been made to develop an ion exchange membrane which is free from such instability in a high temperature, high concentration solution, and which is useful for efficient, direct production of a high concentration caustic soda stably for a prolonged period of time. However, none of the proposals hitherto made is satisfactory in some respects, e.g., durability of the membrane and energy consumption.

International Patent Application Publication No. WO88/09799, as a representative example of the hitherto made proposals, suggests a method in which use is made of a membrane having a porosity-regulated layer containing inorganic material particles disposed on its cathode compartment side in order to protect carboxylate groups. However, according to investigations by the present inventors, the inorganic material particles contained in the porosity-regulated layer as disclosed in the specification of this patent application are inappropriate from the viewpoint of particle size, etc., so that the adhesion of the layer to the membrane is unsatisfactory, thereby bringing about a stability problem.

U.S. Pat. No. 4,900,408, as another example of the hitherto made proposals, discloses a method in which use is made of a membrane comprising a carborylate group-containing layer having a predetermined equivalent weight and, disposed on its surface on a cathode compartment side, a porous layer capable of catholyte diffusion, and in which a saline solution having a NaCl concentration nearly equal to the saturation concentration at the temperature at which electrolysis is performed is introduced, to thereby produce sodium hydroxide in a concentration of from 42 to 54% by weight. As described in the descriptive portion and the examples of the specification of the U.S. patent, the sodium chloride concentration of the saline solution must be 3.52N to produce caustic soda in a concentration of 42% by weight, and the sodium chloride concentration of the saline solution must be 4.2N to produce caustic soda in a concentration of 54% by weight. Accordingly, in order to obtain caustic soda in a concentration of from 45 to 55% by weight as desired in the present invention, the sodium chloride concentration of the saline solution must be about 4N or above. The requirement for concentrations as high as 4N or above is disadvantageous in the commercial production of caustic soda. Further, in the method of this U.S. patent, the amount of water passing through the membrane from the anode compartment to the cathode compartment together with sodium ions, which governs the maximum concentration of produced caustic soda solution, is controlled by regulating the structural unit composition of the carboxylate-containing copolymer provided on the side of the cathode compartment. According to investigations by the present inventors, however, this method is inevitably accompanied by an elevation of electrolytic voltage, thereby increasing energy consumption.

As described above, all of the conventional methods for the production of caustic soda in a high concentration substantially equal to that of the commercially distributed caustic soda have inherent problems in that the sodium chloride concentration of a saline as a feedstock must be inevitably high, thereby causing economical disadvantages, and that energy consumption is large.

SUMMARY OF THE INVENTION

With a view toward developing an electrolyzing method which is free from the above-mentioned drawbacks of the prior art and which is suitable for producing a high concentration alkali metal hydroxide from a saline solution having a low alkali metal chloride concentration stably for a prolonged period of time while ensuring desirable energy saving, the present inventors have made extensive and intensive studies with respect to novel structures for a membrane used in the method and various parameters affecting the performances of the membrane. As a result, unexpectedly, the present inventors have found that the desired electrolysis can be attained by the use of a novel cation exchange membrane comprising a carboxylate-containing fluorocarbon polymer layer disposed on a cathode compartment side and provided on its surface with an inorganic coating, and a sulfonate and/or carboxylate-containing fluorocarbon polymer layer disposed on an anode compartment side and having a specific water content. Based on this unexpected finding, the present invention has been completed.

Accordingly, it is an object of the present invention to provide a novel electrolyzing method which is suitable for producing a high concentration alkali metal hydroxide from a saline solution having a low alkali metal chloride concentration stably for a prolonged period of time while ensuring desirable energy saving.

The foregoing and other objects, features and advantages of the present invention will be apparent from the following detailed description and appended claims.

DETAILED DESCRIPTION OF THE INVENTION

Essentially, according to the present invention, there is provided a method for the electrolysis of an alkali metal chloride, which comprises electrolyzing an alkali metal chloride in an electrolytic cell comprising a cathode compartment and an anode compartment, the cathode compartment and the anode compartment being partitioned by means of a cation exchange membrane, the cation exchange membrane comprising a layer disposed on the side of the cathode compartment and comprised of a fluorocarbon copolymer containing carboxylate groups, and a layer disposed on the side of the anode compartment and comprised of a fluorocarbon copolymer containing sulfonate groups and/or carboxylate groups, the layer disposed on the cathode compartment side having a thickness of from 5 to 50 μm and being provided, on its surface, on the cathode compartment side, with an inorganic coating in an amount of from 0.1 to 10 mg/cm$^2$, the inorganic coating comprising 30 to 95% by weight, based on the total weight of the inorganic coating, of particles of at least one alkali resistant inorganic material selected from the group consisting of oxides, nitrides and carbides of elements belonging to group IV of the Periodic Table, the inorganic material particles having an average primary particle diameter of 0.2 μm or less, and 5 to 70% by weight, based on the total weight of the inorganic coating, of a binder comprised of a hydrophilic fluorocarbon polymer, the layer disposed on the side of the anode compartment having a thickness of from 10 to 200 μm and a water content of from 3 to 10% by weight, and wherein the electrolysis is conducted at a temperature of from 70 to 100° C. and at a current density of from 10 to 60 A/dm$^2$ while introducing an aqueous alkali metal chloride solution having an alkali metal chloride concentration of from 3.0 to 3.5N into the anode compartment, thereby obtaining an aqueous alkali metal hydroxide solution having an alkali metal hydroxide concentration of 45 to 55% by weight in the cathode compartment.

The layer (hereinafter often referred to as "layer A") disposed on the side of the cathode compartment and comprised of a fluorocarbon copolymer containing carboxylate groups is a hydrolysate of a precursor fluorocarbon copolymer having functional groups convertible to carboxylate groups. The precursor fluorocarbon copolymer may be produced by copolymerizing at least one monomer selected from a first group of monomers of the following formula (I) with at least one monomer selected from a second group of monomers of the following formula (II):

$$CF_2=CX_1X_2 \qquad (I)$$

wherein each of $X_1$ and $X_2$ independently represents

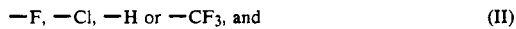

$$-F, -Cl, -H \text{ or } -CF_3, \text{ and} \qquad (II)$$

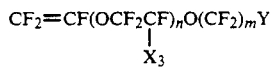

$$CF_2=CF(OCF_2CF)_nO(CF_2)_mY$$
$$\quad\quad\quad\quad\quad |$$
$$\quad\quad\quad\quad X_3$$

wherein $X_3$ represents $-F$ or $-CF_3$, m is an integer of from 1 to 3, n is 0, 1 or 2, and Y is a precursor group which can be converted by hydrolysis to a carboxylate group in the presence of an alkali medium.

The above-mentioned precursor group (Y) which can be converted to a carboxylate group, is selected from the group consisting of a carboxylic ester group represented by the formula $-COOR$ wherein R represents a lower alkyl group having 1 to 4 carbon atoms, a cyano group and an acid halide group represented by the formula $-COZ$ wherein Z represents a halogen atom. Of these, the carboxylic ester group is preferably used. Especially preferred monomers of the second group are respectively represented by the formulae:

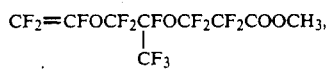

$$CF_2=CFOCF_2CFOCF_2CF_2COOCH_3,$$
$$\quad\quad\quad\quad |$$
$$\quad\quad\quad\quad CF_3$$

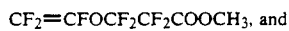

$$CF_2=CFOCF_2CF_2COOCH_3, \text{ and}$$

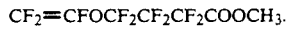

$$CF_2=CFOCF_2CF_2CF_2COOCH_3.$$

To obtain the desired effects in the present invention, it is preferred that the equivalent weight values of the copolymer, which are determined by the types and proportions of monomers of formulae (I) and (II), meet the following requirements. When n of formula (II) is 0, the equivalent weight of the copolymer of layer A is in the range of preferably 600 to 1200, more preferably 750 to 1100; when n of formula (II) is 1, the equivalent weight of the copolymer of layer A is in the range of preferably 900 to 1300, more preferably 1000 to 1250; and when n of formula (II) is 2, the equivalent weight of the copolymer of layer A is in the range of preferably 1100 to 1500, more preferably 1150 to 1400. By using a cation exchange membrane in which the equivalent weight of the copolymer of layer A is in the above mentioned range, high current efficiency can be attained.

The thickness of layer A is from 5 to 50 μm, preferably from 10 to 30 μm. When the thickness of layer A is larger than 50 μm, the electric resistance is likely to become disadvantageously high in the electrolysis. On the other hand, when the thickness of layer A is smaller than 5 μm, not only is no significant effect exhibited for further decreasing the electric resistance but also the structure of the layer is likely to be undesirably non-uniform.

In the present invention, it is extremely important that layer A be provided, on its surface on the side of the cathode compartment, with an inorganic coating in an amount of from 0.1 to 10 mg/cm². This inorganic coating is a layer (hereinafter frequently referred to as "diffusion control layer") specially designed for controlling the diffusion of the catholyte into the membrane.

The exact mechanism of the function of the diffusion control layer has not yet been elucidated, but the following assumption can be made. In the electrolysis of for example, sodium chloride, sodium ions in the form of hydrated ions enter the membrane from the anode compartment side so as to be transported to the cathode compartment side. That is, the sodium ions go through the membrane together with water entrained by the sodium ions. The amount of the entrained water depends thermodynamically on the operating temperature, the current density, the anolyte concentration and the water content of the ion exchange membrane. In this connection, it is believed that the amount of the entrained water controls the catholyte concentration at the surface of layer A on the side of the cathode compartment. On the other hand, the concentration of sodium hydroxide produced in the cathode compartment is increased in accordance with the amount of water consumed by the cathodic reaction. There is a concentration gradient between the sodium hydroxide concentration at the surface of the cation exchange membrane and the sodium hydroxide concentration in the middle of the cathode compartment, which concentration gradient is caused by a change in the ion transportation rate, the viscosity of the catholyte and a change in the rate of the movement of the catholyte. In order to protect the carboxylate groups present at the surface of the membrane from the high concentration catholyte, it is desired to render layer A less susceptible to the concentration gradient and the sodium hydroxide concentration in the cathode compartment. The diffusion control layer disposed at the surface of layer A on the side of the cathode compartment forms a specific concentration layer controlled by the amount of water entrained by sodium ions, which concentration layer renders layer A less susceptible to the catholyte concentration, to thereby protect the carboxylate groups at the surface of layer A. The above is merely an assumption of the functional mechanism of the inorganic coating provided on the surface of layer A on the side of the cathode compartment for controlling the diffusion of the catholyte, and the assumption is by no means binding.

The catholyte diffusion control layer may be of an inorganic coating having hydrophilicity and containing inorganic material particles. The inorganic coating which constitutes a catholyte diffusion control layer preferably comprises chemically stable inorganic material particles and a binder. The chemically stable inorganic material particles are particles of at least one alkali resistant inorganic material selected from the group consisting of oxides, nitrides and carbides of elements belonging to group IV of the Periodic Table. Preferred examples of such inorganic materials include zirconium oxide and silicon carbide. The inorganic material particles have an average primary particle diameter of 0.2 μm or less, preferably from 0.1 to 0.01 μm. The terminology "primary particle" used herein means a particle which can be visually recognized as a minimum unit particle by means of an electron microscope. With respect to "the primary particle", reference can be made to, for example, page 98 of "*Funtai no Hyomen Kaishitsu Gijutsu Shiryoshu* (Technical Data Collection on Surface Modification of Particulate Materials) published by the Publishing Division of Soft Giken, Japan. The primary particles can clearly be discriminated from agglomerated particles and polymers on an electron photomicrograph (magnification: about 100,000). The average primary particle diameter can be obtained based on the diameters of the primary particles, which are measured by an electron microscope. For obtaining an average primary particle diameter, 200 to 500 particles are usually measured in accordance with the ordinarily employed method for measuring particle diameter [reference may be made to, for example, "Funtai Kogaku Binran (Powder Engineering Handbook) edited by Funtai Kogakkai (Japanese Society of Powder Engineering) and published by Nikkan Kogyo Shimbun Sha, Japan, pages 1 to 50, 1986].

The amount of the inorganic material particles, based on the total weight of the inorganic coating, is 30 to 95% by weight. The inorganic coating is uniformly provided in an amount of from 0.1 to 10 mg/cm², preferably from 0.6 to 5 mg/cm². When the amount of the inorganic coating is less than 0.1 mg/cm², the function of controlling the diffusion of the catholyte cannot be exhibited so that the carboxylate groups of layer A cannot be protected from the catholyte having a high concentration. On the other hand, when the amount of the inorganic coating exceeds 10 mg/cm², the function of diffusion control can be exhibited, but the electrical resistance is disadvantageously increased, hampering the effects of the present invention. The particle diameter and the % by weight, based on the total weight of the coating, of inorganic material particles control not only the diffusion of the catholyte, but also the mechanical bonding strength of the coating to the membrane, and thus, it is important that the particle diameter and the amount of the particles be, respectively, in the above-mentioned ranges.

As the binder component of the coating, a hydrophilic fluorocarbon polymer is used. A hydrophilic fluorocarbon copolymer is preferred. Especially preferred is a fluorocarbon copolymer containing sulfonate groups. Preferred examples of such fluorocarbon copolymers include a copolymer having an equivalent weight of from 800 to 1200, preferably from 900 to 1150 as obtained by copolymerizing a monomer selected from the first group of monomers of the formula:

$$CF_2=CX_1X_2 \qquad (I)$$

with a monomer selected from the monomers of the formulae:

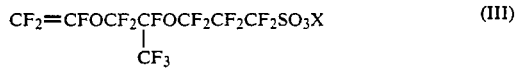

$$CF_2=CFOCF_2\underset{\underset{CF_3}{|}}{C}FOCF_2CF_2CF_2SO_3X \qquad (III)$$

wherein X represents H, Na or K; and

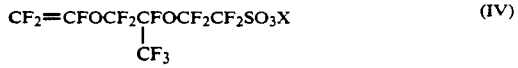

wherein X is as defined above.

The amount of the binder in the inorganic coating is in the range of from 5 to 70% by weight based on the total weight of the coating.

The method for forming the inorganic coating is not particularly limited. For example, the inorganic coating can be formed by a method in which a slurry-like liquid composition obtained by dispersing inorganic material particles in a solution containing the binder, is applied onto one surface of a membrane of a precursor copolymer by a conventional coating method, such as spray coating, roll coating and the like, in a predetermined amount, followed by drying. Alternatively, an inorganic coating layer which has been previously prepared by screen printing or gravure printing, is adhered by heat-pressing onto a membrane of a precursor copolymer.

Alkali-soluble inorganic particles, hydrocarbon compounds and surface active agents may be added as a pore forming agent or a thickening agent in the formation of the inorganic coating.

When the binder is of a melt fabricable type, the formation of the inorganic coating and the lamination thereof onto the membrane of a precursor copolymer can be conducted by the conventional molding methods, such as press molding using a heat press and extrusion molding.

It has surprisingly been found that when the electrolysis of an alkali metal chloride is conducted using a cation exchange membrane comprising layer A having an equivalent weight of 900 to 1300, preferably 1000 to 1250 and provided with the above-described inorganic coating on its surface on the side of the cathode compartment, not only is an extremely high current efficiency exhibited, but also the change of electrolytic voltage according to the change of sodium hydroxide concentration is as extremely small as 30 mV or less per % concentration of sodium hydroxide at a current density of 40A/dm$^2$.

In the cation exchange membrane to be used in the method of the present invention, the layer (hereinafter frequently referred to as "layer B") disposed on the side of the anode compartment is also extremely important. This is because the concentration of sodium hydroxide which can be attained in the electrolysis depends on the characteristics of layer B.

The maximum concentration of sodium hydroxide which can be directly attained in the electrolysis depends on the amount of water (hereinafter referred to as "water transport") entrained by Na ions and transported through the membrane into the cathode compartment, as represented by the following formula:

$$C_{NaOH}(wt\%) = MW_{NaOH}/[MW_{H_2O} \times (T_W - 1) + MW_{NaOH}]$$

wherein $C_{NaOH}$ represents the maximum concentration (% by weight) of sodium hydroxide; $MW_{NaOH}$ represents the molecular weight of of sodium hydroxide; $MW_{H_2O}$ represents the molecular weight of water; and $T_W$ represents the water transport (mole) per equivalent of Na ions.

According to the relationship defined by the above formula, in order to set the sodium hydroxide concentration directly attained by the electrolysis in the range of from 45 to 55% by weight, the water transport has to be set in the range of from 2.8 to 3.7 moles per equivalent of Na ions. The water transport is not only influenced by the operation conditions, such as the operating temperature, the current density and the anolyte concentration, but also influenced to an extremely large extent by the properties of layer B of the ion exchange membrane. Particularly, the water content of the resin constituting layer B of the membrane is important. The water content is essentially in the range of from 3 to 10% by weight. The water content is preferably in the range of from 5 to 9% by weight.

In the present invention, the water content (X) of layer B is measured by immersing the layer in an aqueous caustic soda solution having a caustic soda concentration of 40% by weight at a temperature of 90° C. for a period of 16 hours, taking out the layer, wiping off the solution adhering to the layer from the taken out layer, subjecting the wiped layer to first drying, washing the dried layer with water to remove the sodium hydroxide in the layer and subjecting the washed layer to second drying, and calculated by the formula:

$$X = \frac{W_1 - W_2}{W_3} \times 100 \text{ (\% by weight)}$$

wherein $W_1$ represents the weight of the layer measured after the wiping off of the solution, $W_2$ represents the weight of the layer measured after the first drying, and $W_3$ represents the weight of the layer measured after the second drying.

In the above measurement, the drying conditions for each of the first drying and the second drying are not critical, as long as evaporation of water can be attained. For example, the drying is performed at a temperature of from 60° C. to 90° C., under vacuum, for a period of from 10 to 16 hours.

By setting the water content of layer B disposed on the side of the anode compartment in the range of from 3 to 10% by weight, a water transport of not greater than 3.7 moles per equivalent of sodium ions is realized under operation conditions such that use is made of an aqueous solution containing an alkali metal chloride in a concentration of from 3.0 to 3.5N, which concentration is usually employed in the electrolysis of sodium chloride. The water content of layer B disposed on the side of the anode compartment depends on the equivalent weight of layer B, and the swelling degree of layer B at the time of hydrolysis and equilibrium treatment.

The resin constituting layer B disposed on the side of the anode compartment is a hydrolysate of a copolymer obtained by copolymerizing at least one monomer selected from the first group of monomers of formula (I) described above with at least one monomer selected from the group consisting of the second group of monomers of formula (II) described above and the following group of monomers of formula (V):

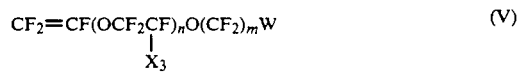

wherein $X_3$ represents —F or —CF$_3$, m is an integer of from 1 to 3, n is an integer of from 0 to 2, and W is a melt fabricable precursor group which can be converted by hydrolysis in an alkali medium to a sulfonate group.

The above-mentioned melt fabricable precursor group which can be converted to a sulfonate group is selected from the group consisting of a sulfonyl halide group represented by the formula $-SO_2X_4$ wherein $X_4$ represents $-F$, $-Cl$ or $-Br$, and an alkylsulfone group represented by the formula $-SO_2R$ wherein R represents a lower alkyl group having 1 to 4 carbon atoms. Preferred examples of monomers of formula (V) include the following monomers having a sulfonyl fluoride group:

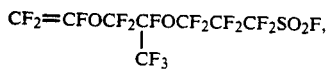

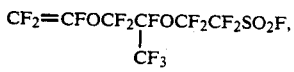

Preferred examples of monomers of the second group described above may be represented by the formulae:

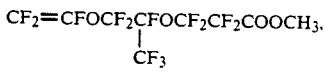

The equivalent weight of layer B depends on the monomer proportions for the copolymerization. When n of formulae (II) and (V) is 0, the equivalent weight of layer B is preferably in the range of from 600 to 900, more preferably from 650 to 850; when n of formulae (II) and (V) is 1, the equivalent weight of layer B is preferably in the range of from 1000 to 1400, more preferably from 1050 to 1300; and when n of formulae (II) and (V) is 2, the equivalent weight of layer B is in the range of from 1150 to 1600, more preferably from 1200 to 1500. A copolymer having an equivalent weight in the above-mentioned range is hydrolyzed to convert the functional group into an ion exchange group, thereby obtaining layer B having a water content of 3 to 10% by weight, preferably 5 to 9% by weight as measured by the method described above. The hydrolysis can be performed by any one of the conventional methods, such as a method in which use is made of an aqueous alkali solution containing a water-soluble organic compound as disclosed in U.S. patent application No. 07/533,400 and a method in which use is made of a basic organic compound as disclosed in U.S. Pat. No. 4,904,701.

An equivalent weight of layer B which is larger or smaller than the above-mentioned range is undesirable from the viewpoint of attaining a water content in the desired range. The thickness of layer B should be 10 μm or greater. When the thickness is smaller than 10 μm, the function of controlling the water transport cannot be exhibited. On the other hand, when the thickness is too large, the electrolytic voltage is likely to be disadvantageously high. The thickness should not exceed 200 μm.

From the viewpoint of ensuring a practical handling strength, a dimensional stability and a long-term stability of electrolytic performances, it is preferred that the cation exchange membrane to be used in the present invention have a reinforcing material encapsulated therein. As the reinforcing material, preferred is a woven fabric comprised of a fibrous material of a tetrafluoroethylene homopolymer or of a copolymer of tetrafluoroethylene with hexafluoropropylene or perfluorovinyl ether. The fiber to be used in the woven fabric is a monofilament yarn or a multifilament yarn. The monofilament and the multifilament each have a size of 50 to 400 denier, preferably 50 to 200 denier. These filaments may be oriented porous filaments or flat-shaped filaments. The reinforcing fabric may assume various forms and the manner of weaving is not particularly limited. Generally, however, from the viewpoint of decreasing a current shielding which is attributed to the ion impermeability inherent in the reinforcing fabric, it is preferred that the texture of the fabric be coarse and the openness, as defined below, of the fabric be large. Preferred examples of reinforcing fabrics include a plain woven fabric and a leno woven fabric.

The term "openness" used herein means a ratio, as expressed in terms of a percentage, of the total area of the window portions defined by the crossed warp and weft strands of the reinforcing fabric to the overall area of the fabric. The above-mentioned total area of the window portions and the overall area of the fabric are readily measured on a photograph showing a plan view of the fabric.

The openness of the reinforcing fabric is preferably in the range of from 50 to 95%, more preferably in the range of from 60 to 90%. When the openness is smaller than 50%, the current shielding is likely to be high, so that the cell voltage is disadvantageously increased. On the other hand, when the openness is larger than 95%, the reinforcing effect is likely to be unsatisfactory.

The thickness of the reinforcing fabric is an important factor which affects the easiness of the encapsulation of the reinforcing fabric in the fluorocarbon polymer layer or layers. Generally, the thickness of the reinforcing fabric is 150 μm or less, preferably 100 μm or less. The thickness of the reinforcing fabric may be controlled by the conventional calendering method.

The method disclosed in U.S. patent application No. 07/236,202 for obtaining a membrane having, encapsulated therein, a reinforcing woven fabric having an openness of at least 55%, which membrane is free of sacrificial strands between adjacent warp strands and between adjacent weft strands of the fabric and free of channels formed by removal of said sacrificial strands, is advantageously employed in the present invention. The use of a membrane having such channels formed by the removal of sacrificial strands is not preferred since the water transport is disadvantageously increased, thus preventing the attainment of the effects of the present invention.

The precursor fluorocarbon copolymer as mentioned hereinbefore which has functional groups convertible to sulfonate groups, carboxylate groups or a mixture thereof is melt fabricable, and can be molded into a precursor membrane by the conventional methods, for example, by press molding using a heat press, shaping by means of rolls, extrusion molding, coextrusion molding, or the like. Of these, an extrusion molding is generally used on a commercial scale. In the present invention, when a precursor reinforced base membrane comprising two or more layers of fluorocarbon copolymers is produced, a coextrusion molding is preferably used. The method for encapsulating the reinforcing fabric in the precursor fluorocarbon copolymer layer or layers is not specifically limited, and with respect to the method for the encapsulation, reference may be made to, for example, U.S. patent application No. 07/236202. For example, the reinforcing fabric may be encapsulated by the method described in the above-mentioned U.S. patent application, in which use is made of an apparatus provided with a mount portion (a drum or a plate) on which a sheet-form material is to be mounted, which mount portion has a vast plurality of tiny through-paths through which a negative pressure or suction force can be applied by means of a vacuum device to the surface of the sheet-form material so that the material may be pressed against the mount portion and also provided with a heating device capable of heating the sheet-form material.

The thus obtained melt fabricable precursor membrane which has been prepared by molding and lamination is then hydrolyzed to convert the precursor ion exchange groups to ion exchange groups, thereby obtaining an ion exchange membrane to be used in the present invention.

In the present invention, not only is the electrolytic voltage lowered but also the durability of the cation exchange membrane is markedly improved by applying a layer capable of preventing the adhesion of chlorine gas to the surface of the cation exchange membrane on the side of the anode compartment. Such a layer capable of preventing the adhesion of chlorine gas to the membrane surface may be comprised of a hydrophilic film containing inorganic material particles. The same composition as employed for forming the inorganic coating comprising 30 to 95% by weight of particles of at least one alkali resistant inorganic material to be disposed on the side of the cathode compartment of the membrane may be applied in an amount of from 0.01 to 5.0 mg/cm$^2$ of the membrane, preferably from 0.05 to 1.0 mg/cm$^2$ of the membrane, to thereby obtain the layer. When the amount is less than 0.01 mg/cm$^2$ of the membrane, the effect of the layer for preventing the adhesion of chlorine gas to the membrane is likely to be unsatisfactory. Even if the amount is increased to more than 5.0 mg/cm$^2$ of the membrane, no further improvement is attained in the effect of the layer for preventing the adhesion of chlorine gas to the membrane.

The method for the application of the above-mentioned layer capable of preventing the adhesion of chlorine gas is not critical. For example, it is effected by first providing a slurry as obtained by uniformly dispersing inorganic material particles in a solution containing a hydrophilic binder polymer, secondly applying a predetermined amount of the slurry according to any of the conventional methods, such as spraying or roll coating, to the surface of the cation exchange membrane, and thirdly drying the applied slurry.

By virtue of the electrolyzing method of the present invention, an aqueous alkali metal hydroxide solution having an alkali metal hydroxide concentration as high as 45 to 55% by weight can be directly produced from a saline solution having an alkali metal chloride concentration of from 3.0 to 3.5N stably for a prolonged period as long as one year or more. During the period, the performance of the membrane at the initial stage is maintained. This is surprising in view of the repeated descriptions in U.S. Pat. No. 4,202,743 to the effect that the carboxylate-containing membrane is unstable in a high temperature, high concentration caustic soda solution.

In the electrolyzing method of the present invention in which a specific cation exchange membrane as defined above, is used, electrolysis is conducted at a temperature of from 70° to 100° C. and at a current density of from 10 to 60 A/dm$^2$ while introducing an aqueous alkali metal chloride solution having an alkali metal chloride concentration of from 3.0 to 3.5N into the anode compartment of an electrolytic cell, thereby obtaining an aqueous alkali metal hydroxide having an alkali metal hydroxide concentration of from 45 to 55% by weight in the cathode compartment of the cell. The type of the electrolytic cell, the power feeding system and the type of the electrode for use in the present invention are not particularly limited, and any of those conventionally employed may be used. Especially, the electrolysis according to the present invention is preferably effected in a narrow to zero gap cell, i.e., a cell having an anode and a cathode disposed at a spacing of about 1.5 mm or less therebetween.

PREFERRED EMBODIMENTS OF THE INVENTION

The present invention will be described in greater detail with reference to the following Examples and Comparative Examples, which should not be construed to be limiting the scope of the present invention. Example 1

A copolymer (A) of tetrafluoroethylene and methyl perfluoro(4,7-dioxa-5-methyl-8-nonanoate) having an equivalent weight of 1,100 and a copolymer (B) of tetrafluoroethylene and methyl perfluoro(4,7-dioxa-5-methyl-8-nonanesulfonyl fluoride) having an equivalent weight of 1,150, are subjected to a coextrusion molding at 260° C., thereby obtaining a laminated film consisting of a copolymer (A) film having a thickness of 25 $\mu$m and a copolymer (B) film having a thickness of 130 $\mu$m.

A plain woven fabric is obtained comprising warp and weft polytetrafluoroethylene strands each having a size of 200 denier in respective counts of 18 strands per inch. The plain woven fabric has an openness of 68% in terms of the ratio of the total area of the window portions to the overall area of the fabric, which openness is measured by an optical projection method. The plain woven fabric is embedded in the polymer (B) film of the laminated film, thereby obtaining a unified membrane.

An amount of 10% by weight of a copolymer of tetrafluoroethylene and methyl perfluoro(4,7 dioxa-5-methyl-8-nonane sulfonyl fluoride) having been converted to an acid form and having an equivalent weight of 1,000 is dissolved in a 50:50 by weight mixture of water and ethanol. Zirconium oxide having an average primary particle diameter of 0.03 $\mu$m is added to the resultant solution in an amount of 40% by weight. The zirconium oxide is uniformly dispersed in the solution by a shaker, thereby obtaining a suspension. The suspension is repeatedly sprayed onto the surface of the polymer (A) of the membrane, and dried, thereby forming a uniform inorganic particle layer in an amount 3 mg/cm$^2$. The resultant membrane is subjected to hydrolysis in an aqueous potassium hydroxide solution containing dimethylsulfoxide, followed by equilibrating treatment with a 0.1N caustic soda. After the equilibrating treatment, part of the membrane is cut off with a microtome, and the thus obtained membrane sample is dyed with an acidic aqueous solution of malachite green. Then, the dyed sample is observed through a microscope, and it is confirmed that hydrolysis has proceded throughout the film thickness.

The thus obtained double layer membrane is set in an electrolytic cell in a manner such that the outer surface of film (A) faces a low hydrogen overpotential cathode and the outer surface of film (B) faces a low chlorine overpotential anode. A saline solution having a sodium chloride concentration adjusted to 3.35N is introduced into the anode compartment, and electrolysis is conducted at 90° C. at a current density of 40 A/dm². By adding diluent water to the catholyte, the concentration of caustic soda is successively changed, and the thus obtained electrolytic performance is shown in Table (1). The addition of the diluent water is stopped 40 days after the start of the electrolysis. The final maximum caustic soda concentration is 47% by weight at the sodium chloride concentration of saline of 3.35N. After 50 days of the electrolysis, the sodium chloride concentration of the saline solution is increased to 3.40N. As a result, caustic soda is directly produced in a concentration of 50% by weight. Current efficiency is substantially constant while the caustic soda concentration is in the range of from 30% to 50%. The change of the electrolytic voltage according to the change of caustic soda concentration is about 20 mV per % concentration of caustic soda. Subsequent to 70 days of the electrolysis under the above conditions, the electrolysis is further continued at a current efficiency of 96%, at an electrolytic voltage of 3.53 V, and for 50 days, thereby stably obtaining caustic soda in a concentration of 47% by weight.

A film having a thickness of 50 μm is prepared from each of polymer (A) and polymer (B) and subjected to the same hydrolysis and equilibriating treatment as performed for the above-described double layer membrane. The film is then subjected to the water content measurement as described hereinbefore. As a result, it is found that the water content of polymer (A) film is 2.5% by weight and the water content of polymer (B) is 7.2% by weight.

ate groups has decreased. The electrolysis performance shown in Table 2 is inferior to that shown in Table 1 for the membrane prepared in Example 1, at caustic soda concentrations of 40–45% by weight.

TABLE 2

| Concentration of caustic soda (% by weight) | Electrolysis performed (days) | Comparative Example 1 | |
|---|---|---|---|
| | | Current efficiency (%) | Voltage (V) |
| 1 | 30 | 10 | 97.0 | 3.30 |
| 2 | 35 | 10 | 97.2 | 3.61 |
| 3 | 40 | 10 | 96.0 | 3.98 |
| 4 | 45 | 10 | 94.6 | 4.30 |
| 5 | 45 | 50 | 89.0 | 4.60 |

Comparative Example 2

A double layer membrane is prepared in substantially the same manner as described in Example 1, except that the equivalent weight of polymer (B) is 950. The water content of the film of polymer (B) having an equivalent weight of 950 is 10.5%, as measured in substantially the same manner as in Example 1. The electrolysis is performed using the prepared membrane at a current density of 40 A/dm² and at a temperature of 90° C. while introducing a saline solution having a sodium chloride concentration adjusted to 3.35N into the same electrolytic cell as used in Example 1. The results are shown in Table 3.

After 10 days of the electrolysis, the addition of diluent water is stopped, and further, electrolysis is continued. As a result, the final maximum caustic soda concentration is 40% by weight at the sodium chloride concentration of 3.35N. Even if the sodium chloride concentration is increased to 3.50N, the caustic soda concentration is only 42% by weight.

TABLE 3

| Electrolysis performed (days) | Concentration of caustic soda (%) | Concentration of sodium chloride (N) | Water transport (mol/equivalent of Na ion) | Current efficiency (%) | Voltage (V) |
|---|---|---|---|---|---|
| 1 | 1–10 | 35 | 3.35 | 4.3 | 96.0 | 3.20 |
| 2 | 10–20 | 40 | 3.35 | 4.3 | 96.2 | 3.30 |
| 3 | 20–30 | 42 | 3.50 | 4.0 | 95.0 | 3.35 |

TABLE 1

| Electrolysis Performed (days) | Caustic soda concentration in cathode compartment (%) | NaCl concentration in anode compartment (N) | Water transport (mol/equivalent of Na ion) | Current efficiency (%) | Voltage (V) |
|---|---|---|---|---|---|
| 1 | 1–10 | 30 | 3.35 | 3.5 | 97.0 | 3.23 |
| 2 | 10–20 | 33 | 3.35 | 3.5 | 97.3 | 3.29 |
| 3 | 20–30 | 38 | 3.35 | 3.5 | 97.3 | 3.39 |
| 4 | 30–40 | 40 | 3.35 | 3.5 | 97.1 | 3.43 |
| 5 | 40–50 | 47 | 3.35 | 3.5 | 96.2 | 3.55 |
| 6 | 50–70 | 50 | 3.40 | 3.5 | 95.1 | 3.63 |
| 7 | 70–120 | 47 | 3.35 | 3.5 | 96.0 | 3.53 |

Comparative Example 1

A membrane is prepared in substantially the same manner as descried in Example 1, except that an inorganic particle layer is not provided on the surface of the membrane, that is one the side of the cathode compartment. The electrolysis is performed using the prepared membrane, in the manner as described in Example 1. The results are shown in Table 2.

When the electrolysis is performed at a caustic soda concentration of 45% for a period of 60 days, a lowering of current efficiency and an elevation of voltage are observed. Then, the electrolysis is discontinued, and the surface of the membrane on the side of the cathode compartment is analyzed by infrared spectrophotometry. As a result, it is found that the number of carboxyl- Example 2

A copolymer (A') of tetrafluoroethylene and methyl perfluoro(4,7-dioxa-5-methyl-8-nonanoate) having an equivalent weight of 1190 and a copolymer (B') of tetrafluoroethylene and methyl perfluoro(4,7-dioxa-5-methyl-8-nonanesulfonyl fluoride) having an equivalent weight of 1080 are subjected to a coextrusion molding at 260° C., thereby obtaining a laminated film consisting a copolymer (A') film having a thickness of 25 μm and a copolymer (B') film having a thickness of 90 μm.

Separately, a copolymer (C) of tetrafluoroethylene and methyl perfluoro(4,7-dioxa-5-methyl-8-nonanesulfonyl fluoride) having an equivalent weight of 1200 is extrusion molded at 260° C., thereby obtaining a copolymer (C) film having a thickness of 40 μm.

The plain woven fabric as used in Example 1 is sandwiched between the copolymer (C) film and the copolymer (B') film side of the laminated film, and encapsulation of the fabric into the films is performed using an apparatus provided with a plate for mounting thereon the sandwiched films, which plate has a vast plurality of tiny through-paths through which a negative pressure is applied by means of a vacuum device to the surface of the sandwiched films so that the sandwiched films is pressed against the plate and also provided with a heating device capable of heating the sandwiched films, according to the procedure as described in U.S. patent application No. 07/236,202. Thus, a precursor membrane is obtained. An inorganic particular layer is applied to the precursor membrane, and the resultant precursor membrane is subjected to hydrolysis and equilibrating treatment to thereby obtain a cation exchange membrane, in substantially the same manner as described in Example 1.

The thus obtained cation exchange membrane is evaluated for electrolytic performance at a sodium chloride solution of 3.35N, in substantially the same manner as described in Example 1. The results are shown in Table 4.

TABLE 4

| | Concentration of caustic soda (%) | Water transport (mol/ equivalent of Na ion) | Current efficiency (%) | Electrolytic voltage (V) | Electrolysis performed (days) |
|---|---|---|---|---|---|
| 1 | 33 | 3.3 | 97.0 | 3.38 | 10 |
| 2 | 45 | 3.3 | 96.5 | 3.58 | 50 |
| 3 | 50 | 3.3 | 95.5 | 3.65 | 80 |

Example 3

Substantially the same procedure as described in Example 2 is repeated, except that a copolymer (polymer (D)) of tetrafluoroethylene and methyl perfluoro(4-oxa-5-hexanoate) having an equivalent weight of 760 is employed instead of polymer (C). The water content of the film of polymer (D) is 5.0% by weight. The electrolytic performance is evaluated, and the results are shown in Table 5.

TABLE 5

| | Concentration of caustic soda (%) | Water transport (mol/ equivalent of Na ion) | Current efficiency (%) | Electrolytic voltage (V) | Electrolysis performed (days) |
|---|---|---|---|---|---|
| 1 | 33 | 3.2 | 97.0 | 3.30 | 10 |
| 2 | 45 | 3.2 | 96.5 | 3.50 | 50 |
| 3 | 50 | 3.2 | 95.5 | 3.60 | 80 |

Comparative Example 3

Substantially the same procedure as described in Example 2 is repeated, except that polymer (A) having a water content of 2.5% by weight as employed in Example 1 is used instead of polymer (C). The electrolytic performance is evaluated, and the results are shown in Table 6.

TABLE 6

| | Concentration of caustic soda (%) | Water transport (mol/ equivalent of Na ion) | Current efficiency (%) | Electrolytic voltage (V) | Electrolysis performed (days) |
|---|---|---|---|---|---|
| 1 | 33 | 2.9 | 97.0 | 3.80 | 5 |
| 2 | 45 | 2.9 | 96.5 | 4.21 | 7 |

The electrolytic voltage is extremely high, and has increased with the lapse of time. Accordingly, the electrolysis has been discontinued within a short period of time.

What is claimed is:

1. A method for the electrolysis of an alkali metal chloride, which comprises electrolyzing an alkali metal chloride in an electrolytic cell comprising a cathode compartment and an anode compartment at a temperature of from 70° to 100° C. and at a current density of from 10 to 60 A/dm$^2$ while introducing an aqueous alkali metal chloride solution having an alkali metal chloride concentration of from 3.0 to 3.5N into the anode compartment, said cathode compartment and said anode compartment being partitioned by means of a cation exchange membrane, said cation exchange membrane, having a cathode compartment side and anode compartment side, consisting essentially of a layer disposed on the side of said cathode compartment and comprised of a fluorocarbon copolymer containing carboxylate groups, and a layer disposed on the side of said anode compartment and comprised of a fluorocarbon copolymer containing sulfonate groups, carboxylate groups or mixtures thereof, said layer disposed on the cathode compartment side having a thickness of from 5 to 50 μm and being provided, on its surface on the cathode compartment side, with an inorganic coating in an amount of from 0.1 to 10 mg/cm$^2$, said inorganic coating comprising 30 to 95% by weight, based on the total weight of said inorganic coating, of particles of at least one alkali resistance inorganic material selected from the group consisting of oxides, nitrides and carbides of elements belonging to group IV of the Periodic Table, said inorganic material particles having an average primary particle diameter of 0.2 μm or less, and 5 to 70% by weight, based on the total weight of said inorganic coating, of a binder comprised of a hydrophilic fluorocarbon polymer, said layer disposed on the anode compartment side having a thickness of from 10 to 200 μm and a water content of from 3 to 10% by weight, thereby obtaining an aqueous alkali metal hydroxide solution having an alkali metal hydroxide concentration of from 45 to 55% by weight in the cathode compartment.

2. The method according to claim 1, wherein said aqueous alkali metal chloride solution introduced into the anode compartment is in the range of from 3.0 to 3.4N.

3. The method according to claim 1, wherein the water content of the layer disposed on the anode compartment side is in the range of from 5 to 9% by weight.

4. The method according to claim 1, wherein said cation exchange membrane further comprises a reinforcing woven fabric comprising warp and weft strands of a perfluorinated polymer each having a size of from 50 to 400 denier, said warp and weft strands crossing each other to form window portions defined by the crossed warp and weft strands, said fabric being encapsulated in at least one of said layers, said fabric having an openness of at least 55%, said openness being defined as a ratio of the total area of the window portions to the overall area of the fabric, said membrane being free of sacrificial strands between adjacent warp strands and between adjacent weft strands of the fabric and free of channels formed by removal of said sacrificial strands.

5. The method according to claim 1, wherein said layer disposed on the side of said cathode compartment is comprised of a fluorocarbon copolymer comprising $$CF_2=CX_1X_2 \tag{I}$$

wherein $X_1$ and $X_2$ are each —F, —Cl, —H or —CF$_3$, and $$CF_2=CF(OCF_2CF)_nO(CF_2)_mY \atop X_3 \tag{II}$$

wherein $X_3$ is —F or —CF$_3$, m is 1 to 3, n is 0, 1 or 2 and Y is a carboxylate group.

6. The method according to claim 1, wherein said layer disposed on the side of said anode compartment is comprised of a fluorocarbon copolymer comprising $$CF_2=CX_1X_2 \tag{I}$$

wherein $X_1$ and $X_2$ are each —F, —Cl, —H or —CF$_3$, and $$CF_2=CF(OCF_2CF)_nO(CF_2)_mY \atop X_3 \tag{II}$$

wherein $X_3$ is —F or —CF$_3$, m is 1 to 3, n is 0, 1 or 2 and Y is a carboxylate group, $$CF_2=CF(OCF_2CF)_nO(CF_2)_mW \atop X_3 \tag{V}$$

wherein $X_3$ is —F, or —CF$_3$, m is 1 to 3, n is 0, 1 or 2 and W is a sulfonate group or a mixture of (II) and (V).

7. The method according to claim 1, wherein said binder is comprised of a hydrophilic fluorocarbon polymer comprising $$CF_2=CX_1X_2 \tag{I}$$

wherein $X_1$ and $X_2$ are each —F, —Cl, —H or —CF$_3$ and $$CF_2=CFOCF_2CFOCF_2CF_2CF_2SO_3X \atop CF_3 \tag{III}$$

wherein X is —H, —Na or —K or $$CF_2=CFOCF_2CFOCF_2CF_2SO_3X \atop CF_3 \tag{IV}$$

wherein X is —H, —Na or —K.

* * * * *